United States Patent [19]

Igarashi et al.

[11] Patent Number: 4,874,574
[45] Date of Patent: Oct. 17, 1989

[54] CONTROL ROD

[75] Inventors: Takao Igarashi; Satoshi Sugawara; Yuichiro Yoshimoto, all of Hitachi; Shozo Saito, Mito; Takashi Fukumoto; Zenichiro Endo, both of Hitachi; Katsutoshi Shinbo, Katsuta, all of Japan

[73] Assignee: Hitachi, Ltd., Tokyo, Japan

[21] Appl. No.: 23,230

[22] Filed: Mar. 9, 1987

[30] Foreign Application Priority Data

| Mar. 14, 1986 | [JP] | Japan | 61-54819 |
| Mar. 20, 1986 | [JP] | Japan | 61-60579 |
| Apr. 11, 1986 | [JP] | Japan | 61-82118 |
| Nov. 12, 1986 | [JP] | Japan | 61-267612 |

[51] Int. Cl.$^4$ .............................................. G21C 7/10
[52] U.S. Cl. ...................... 376/333; 376/327
[58] Field of Search .............. 376/333, 327, 334, 454, 376/233, 440

[56] References Cited

U.S. PATENT DOCUMENTS

| 3,115,452 | 12/1963 | Rock . | |
| 3,138,536 | 6/1964 | Murray et al. | 376/334 |
| 3,163,583 | 12/1964 | Widmer et al. | 376/334 |
| 3,234,104 | 2/1966 | Gale et al. | 376/327 |
| 3,309,118 | 3/1967 | Anthony | 376/334 |
| 3,330,736 | 7/1967 | Cousseran et al. | 376/454 |
| 3,712,852 | 1/1973 | Fisher | 376/333 |
| 4,285,769 | 8/1981 | Specker et al. . | |
| 4,460,538 | 7/1984 | Yamashita . | |
| 4,655,989 | 4/1987 | Kawashima et al. | 376/333 |
| 4,655,999 | 4/1987 | Maruyama et al. | 376/333 |
| 4,676,948 | 6/1987 | Cearley et al. | 376/333 |
| 4,678,628 | 7/1987 | Freeman | 376/333 |

FOREIGN PATENT DOCUMENTS

| 0130483 | 1/1985 | European Pat. Off. . | |
| 3624318 | 3/1987 | Fed. Rep. of Germany . | |
| 3721627 | 1/1988 | Fed. Rep. of Germany . | |
| 51-41199 | 4/1976 | Japan | 376/333 |
| 0066190 | 6/1977 | Japan | 376/327 |
| 0074697 | 7/1978 | Japan | 376/333 |
| 0085295 | 7/1978 | Japan | 376/333 |
| 0148693 | 12/1978 | Japan | 376/327 |
| 0011387 | 2/1981 | Japan | 376/333 |
| 0171293 | 10/1982 | Japan . | |
| 0079181 | 5/1984 | Japan | 376/333 |
| 0192992 | 11/1984 | Japan | 376/333 |
| 0071988 | 4/1985 | Japan | 376/333 |
| 397098 | 2/1966 | Switzerland . | |
| .926133 | 5/1963 | United Kingdom | 376/333 |

Primary Examiner—Harvey E. Behrend
Attorney, Agent, or Firm—Antonelli, Terry & Wands

[57] ABSTRACT

A control rod has blades each of which includes a neutron absorption region in which neutron absorbers each loaded to the core of a reactor from below and made of absorption nuclear chain type neutron absorber are disposed. The neutron absorption region is divided into two, upper and lower, regions in an axial direction; the boundary between the upper and lower regions is positioned within the range of from $\frac{3}{8}$ to $\frac{5}{8}$ of the full length of the neutron absorption region in the axial direction from the lower end of the neutron absorption region; and the quantity of the absorption nuclear chain type neutron absorber contained in the lower region in the section perpendicular to the axial direction is smaller than the quantity of the absorption nuclear chain type neutron absorber contained in the upper region in the section perpendicular to the axial direction.

28 Claims, 9 Drawing Sheets

FIG. 3
FIG. 4
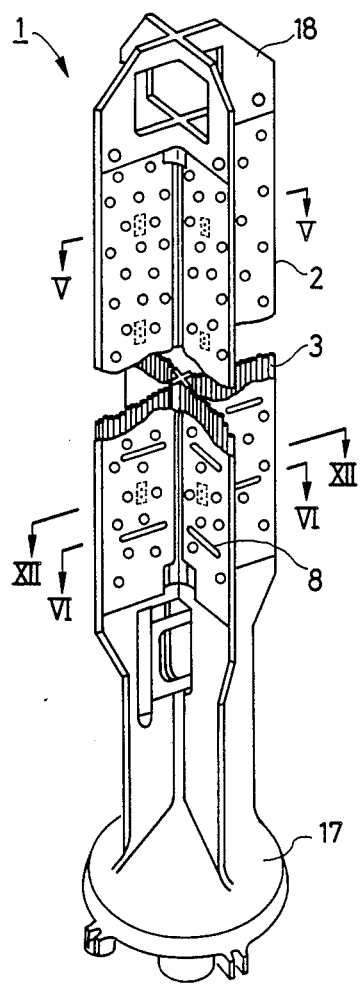
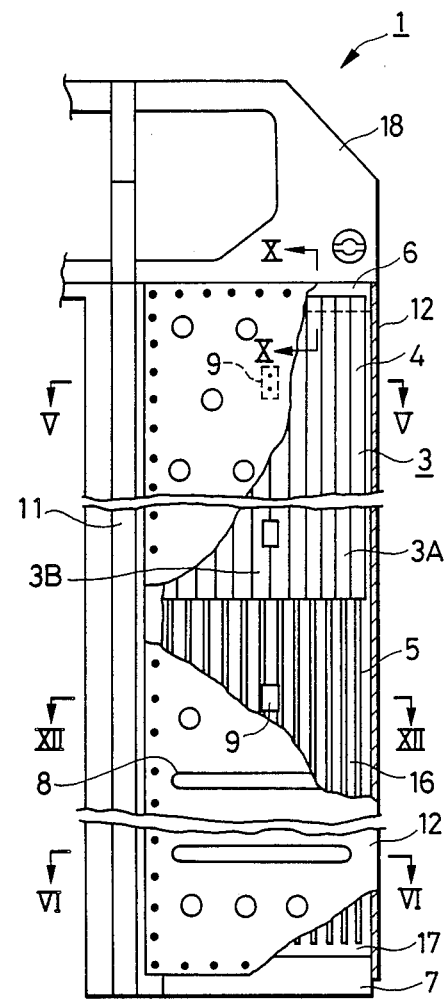

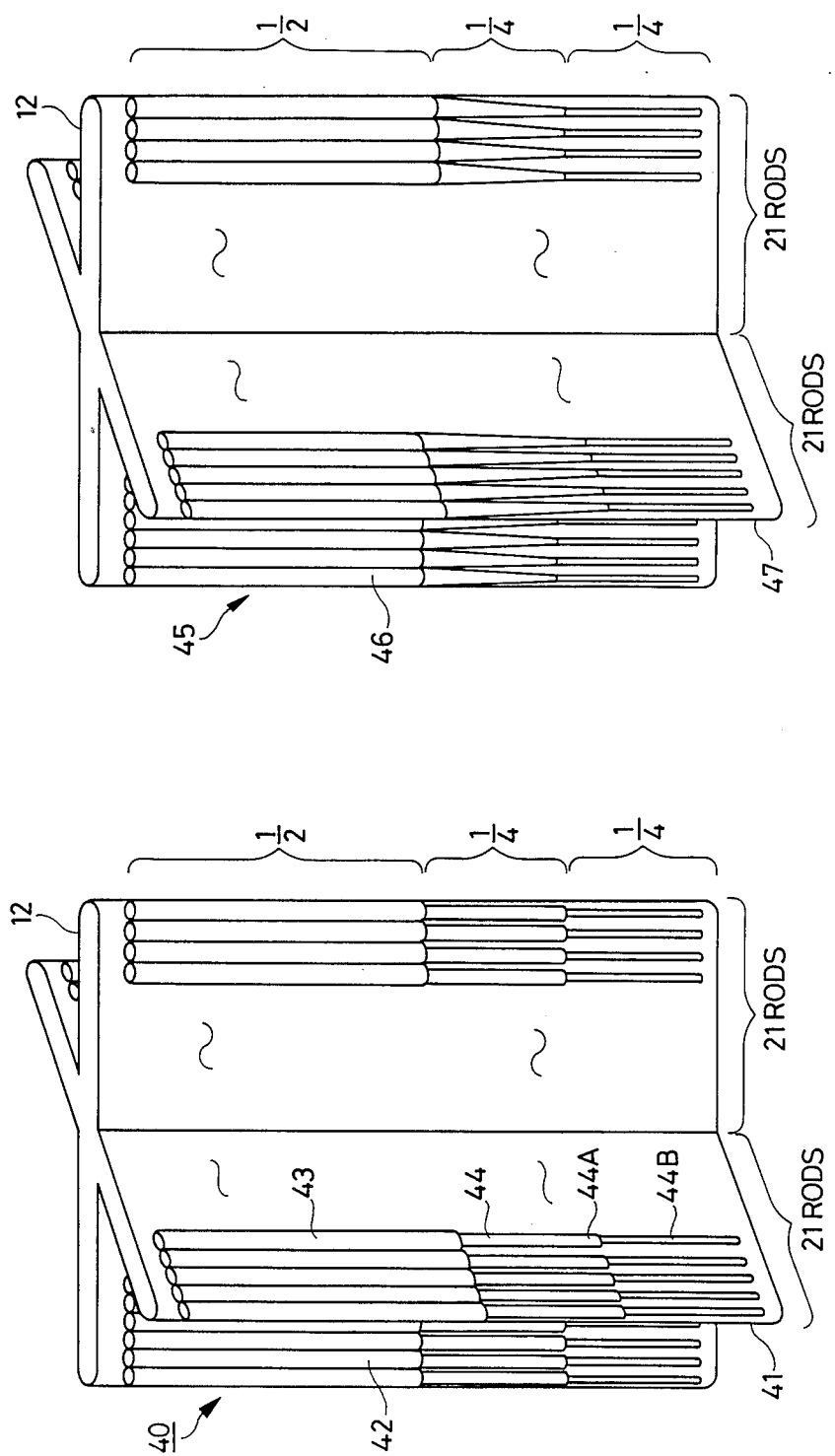

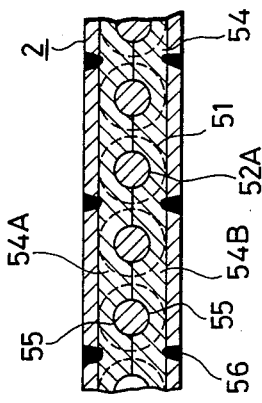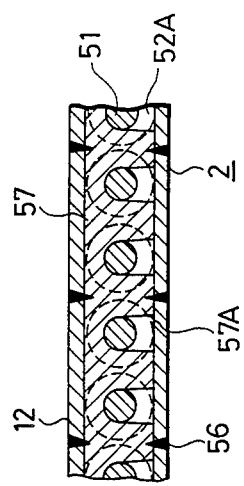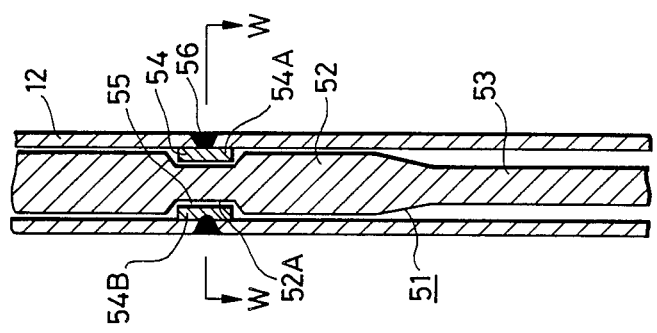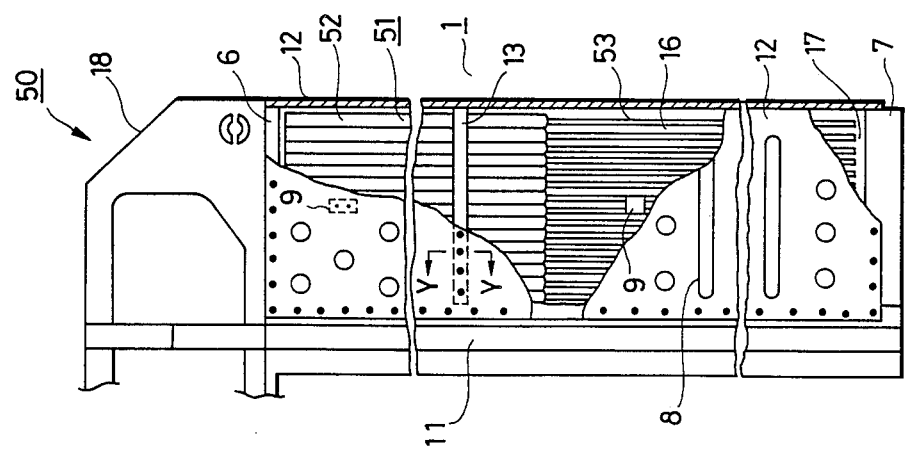

CONTROL ROD

BACKGROUND OF THE INVENTION

This invention relates to a control rod and more particularly, to a control rod that can be used suitably for a boiling water reactor.

A control rod for use in a boiling water reactor has a crisscross sectional shape and four blades. Each blade is constituted by disposing a large number of neutron absorption rods in a sheath bent in a U-shape. Each sheath is fitted to a tie rod disposed at the axis of the control rod. The neutral absorption rods are aligned but are not fixed, inside the space defined by the tie rod, the sheath, an upper support member fitted to the upper portion of the tie rod and the upper surface of a velocity limiter fitted to the upper end portion of the tie rod.

The neutron absorption rod of the control rod, which is produced by packing $B_4C$ powder into a cladding tube, involves the problem that its mechanical and nuclear life is short.

The problem described above can be solved to certain extents by the control rod disclosed in Japanese Patent Laid-Open No. 74697/1978 and U.S. Pat. No. 4,285,769 (FIG. 9D). In accordance with the prior art references, long life type neutron absorption rods having long nuclear and mechanical life are disposed at the upper end portion and blade end portions of the control rod where a neutron exposure is particularly large among the control rod. In other words, in the control rod of this kind, a long life type neutron absorber such as hafnium (Hf) or europium (Eu) is disposed at the upper end portion and blade end portion of the blade and a poison tube having boron carbide ($B_4C$) powder packed therein and fitted into a thinly elongated cladding tube made of stainless steel (SUS) is disposed at the rest of portions. However, this control rod is not yet free from the drawback that its service life is shorter than that of a control rod made solely of a long life type neutron absorber because the long life type neutron absorber is used only for part of the control rod.

To solve the problem described above, attempts have been made to replace the neutron absorber of the control rod by the long life type neutron absorber such as hafnium. One example of the control rods of this kind is illustrated in FIG. 4 of Japanese Patent Laid-Open No. 192,992/1984. In the control rod of this reference, all the neutron absorbers are made of hafnium, and solid hafnium is disposed at the upper portion of the rod while hollow hafnium is disposed at the lower portion. The solid hafnium region is positioned above a point which is $\frac{3}{4}$ of the full length of the neutron absorber from its lower end.

In accordance with Japanese Patent Laid-Open No. 171,293/1982, on the other hand, a shock absorber or in other words, stainless pipes having a reduced thickness, are inserted horizontally between the upper end surface of the neutron absorber and an upper support member and between the lower end surface of the neutron absorber and the upper surface of a velocity limiter. The stainless pipes are disposed in order to mitigate the impact applied by the neutron absorber to the upper support member and to the velocity limiter at the time of ordinary driving or scram of the control rod.

SUMMARY OF THE INVENTION

It is an object of the present invention to provide a control rod capable of obtaining sufficient reactor stop margin when a reactor is stopped.

It is another object of the present invention to provide a control rod capable of preventing deformation of a sheath constituting a blade without remarkably reducing the quantity of neutron absorber.

It is still another object of the present invention to provide a control rod capable of preventing the impact applied by a neutron absorption rod to structural members on the insertion side of the control rod at the time of its scram through a simple construction for an extended period of time before the life of the control rod is reached.

The first characterizing feature of the present invention lies in that the control rod of the invention has a neutron absorption region in which neutron absorbers inserted into the core of a reactor from below and comprising an absorption nuclear chain type neutron absorber are disposed, the neutron absorption region is divided into two, upper and lower, regions in an axial direction, the boundary between the upper and lower region is positioned within the range of from $\frac{3}{8}$ to $\frac{5}{8}$ of the full length of the neutron absorption region in the axial direction from the lower end of the neutron absorption region, and the quantity of the absorption nuclear chain type neutron absorber contained in the section perpendicular to the axis in the lower region is smaller than that in the section perpendicular to the axis in the upper region.

The second characterizing feature of the present invention lies in that sheath deformation prevention means are added to the first characterizing feature described above and these means are disposed inside recesses or through-holes formed in the neutron absorbers and moreover, between the opposite side walls of the sheaths.

The third characterizing feature of the present invention lies in that restriction-support means for restricting the movement of the neutron absorption rods in the axial direction and supporting them in the suspended state inside each blade are added to the first characterizing feature of the invention described above.

These and other characterizing features of the invention will become more apparent from the following description when taken in conjunction with the accompanying drawings.

BRIEF DESCRIPTION OF THE DRAWINGS

FIG. 3 is a schematic view of a control rod in accordance with a preferred embodiment of the present invention;

FIG. 4 is a structural view of one blade shown in FIG. 3;

FIGS. 14, 15, 16, 19 and 20 are schematic structural views of control rods in accordance with other embodiments of the present invention;

FIG. 25 is a structural view of a blade of a control rod in accordance with still another embodiment of the present invention;

FIG. 26 is a sectional view taken along line Y—Y of FIG. 25;

FIG. 27 is a sectional view taken along line W—W of FIG. 26; and

FIG. 28 is a structural view of another example of the structure shown in FIG. 27.

DESCRIPTION OF THE PREFERRED EMBODIMENTS

As a result of intensive studies of the characteristics of a boiling water reactor by use of a control rod shown in FIG. 4 of Japanese Patent Laid-Open No. 192,992/1984, the inventors of the present invention found out the problem that the reactor stop margin was small by use of the control rod. The present invention is therefore directed to solve this problem.

Figure 1:
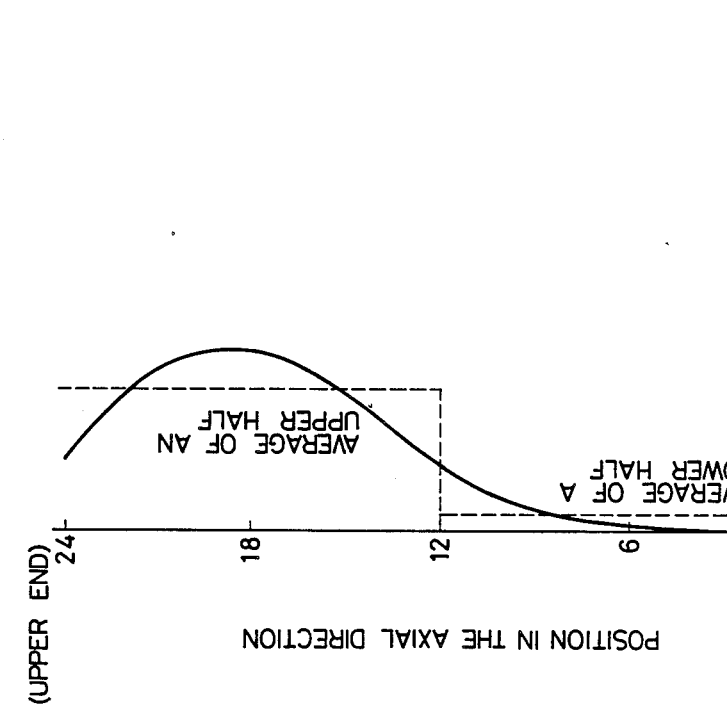
FIG. 1 is a diagram showing the distribution of neutron importance in the axial direction during the stop of the operation of a reactor.

The neutron importance distribution in the axial direction of a core when a boiling water reactor stops is shown in FIG. 1 of the accompanying drawings. As shown in FIG. 1, the neutron importance distribution at the time of stop of the reactor has a peak at the upper portion of the core.

Figure 2:
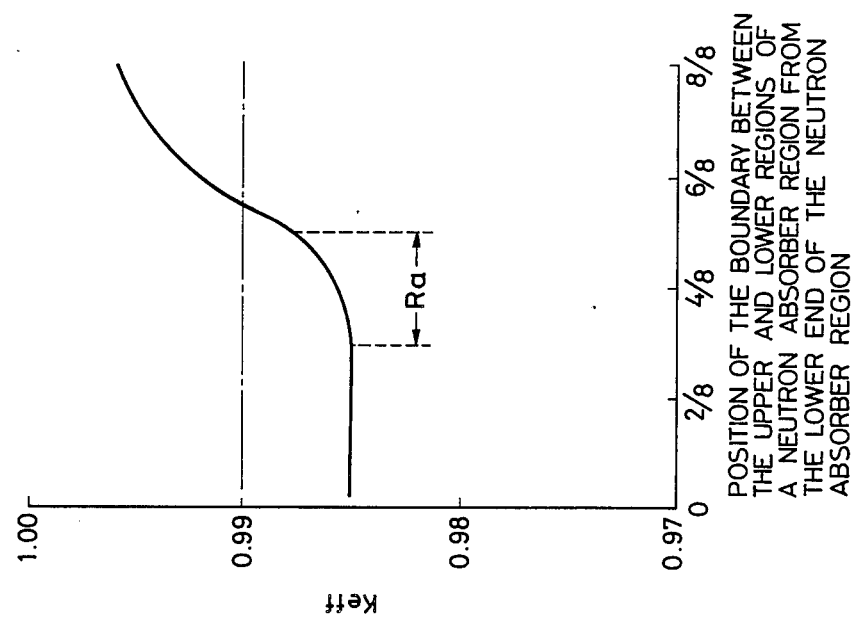
FIG. 2 is a diagram showing the change of an effective multiplication factor with the change of a position of a boundary between the upper and lower regions in a control rod.

FIG. 2 shows the change of an effective multiplication factor with the change of a boundary between upper and lower regions with respect to a control rod when one control rod having a maximum value is not inserted into a core when the control rod having the upper region having a large hafnium quantity and the lower region having a small hafnium quantity as disclosed in the Japanese Patent Laid-Open No. 192,992/1984, or more definitely, when a control rod equipped with an increased diameter portion in the upper region and a reduced diameter portion in the lower region as shown in later appearing FIG. 4 is inserted completely into the core and the reactor is stopped. The characteristics shown in FIG. 2 are determined in the reactor which causes the neutron importance distribution such as shown in FIG. 1 at the stop of the reactor. The reactor reaches the critical point when the effective multiplication factor is 1.

The abscissa in FIG. 2 represents the position of the boundary between the upper region, where the amount of the neutron absorber is great on the cross-sectional plane perpendicular to the neutron absorber packing region where the neutron absorbers are packed, and the lower region where the amount of the neutron absorber is small on the cross-sectional plane, that is, the position of the boundary from the lower end of the neutron absorber packing region. In FIG. 2, numeral 0 represents the lower end of the neutron absorber packing region and numeral 8/8 represents its upper end. The ordinate in FIG. 2 represents the effective multiplication factor Keff. The effective multiplication factor is preferably kept below 0.99 so that the reactor does not reach the critical point due to turbulence or the like even when one control rod is not inserted as described above. If the boundary between the upper and lower regions is positioned above ⅝ of the entire length in the axial direction of the neutron absorber packing region from the lower end of the neutron absorber packing region, the hafnium quantity in the upper region decreases though the peak of the neutron importance exists in the upper region shown in FIG. 1, so that the effective multiplication factor increases drastically. This means that the reactor stop margin decreases drastically, and safety of the reactor is deteriorated when the reactor stops.

If the boundary between the upper and lower regions is positioned below ⅜ of the full length of the neutron absorber packing region in the axial direction from the lower end of the neutron absorber packing region, the effective multiplication factor becomes equal to that when the boundary is positioned at ⅜ in the axial direction, in relation with the neutron importance distribution shown in FIG. 1, and does not change. This means that the reactor stop margin does not increase even when the boundary between the upper and lower regions is disposed at a much lower position, and only the increase in the weight of the control rod occurs. The weight increase of the control rod makes it difficult for a control rod driving device to smoothly operate the control rod. This is a critical problem particularly because an absorption nuclear chain type neutron absorber such as hafnium is by far heavier than B$_4$C. Therefore, reduction of the weight of the control rod must by all means be solved.

In the control rod using the neutron absorber consisting of absorption nuclear chain type neutron absorber such as hafnium, the boundary between its upper and lower regions must be disposed within the range of ⅜ to ⅝ (the range Ra shown in FIG. 2) of the full length of the neutron absorber packing region in the axial direction from the lower end of the packing region. If the boundary between the upper and lower regions are within this range, the control rod using the neutron absorber consisting of the absorption nuclear chain type neutron absorber can possess the weight that can be operated by the control rod driving device.

Here, the term "absorption nuclear chain type neutron absorber" means those neutron absorbers of the type in which nuclides that absorb further neutrons appear in the nuclides formed by the neutron absorption reaction or disintegrated nuclides thereof and which have a low attenuation speed of the neutron absorption effect. Definite examples of such absorbers include Hf, Eu$_2$O$_3$, Ta, and Ag–In–Cd alloy.

An embodiment of the control rod in accordance with the present invention applied to a boiling water reactor will now be described with reference to FIGS. 3 and 4.

The control rod of the invention has the appearance such as shown in FIG. 3. In other words, the control rod 1 has a crisscross sectional shape and has four blades 2 each extending in a radial direction from the axis. A velocity limiter 17 is disposed below the blades 2. A handle 18 is fitted to the upper end of the blades 2. Though not shown in the drawing, the control rod is removably interconnected to a control rod driving device in a pressure container of the reactor. The velocity limiter 17 is connected at its lower end portion to the control rod driving device. The shape of each blade 2 of the control rod 1 will be described with reference to FIGS. 4, 5 and 6. Each blade 2 comprises a U-shaped sheath (made of SUS (stainless steel) 12 which is fitted at its both end portions to a tie rod 11 made of SUS and disposed at the axis of the control rod 1 and a neutron absorber 3 disposed inside the sheath 12. An upper support member 6 is welded to the upper end portion of the tie rod 11 while a lower support member 7 is welded to the lower end portion of the tie rod 11. The upper end portion of the U-shaped sheath 12 encompasses the upper support member 6 and is spot-welded to the upper support member 6. The lower end portion of the sheath 12 encompasses the lower support member 7 and is spot-welded thereto. A large number of holes are bored in the sheath 12 so that when the control rod 1 is fitted into the reactor, the cooling water inside the reactor flows into the sheath 12 through these holes. The cooling water cools the control rod 3 as will be described elsewhere.

The handle 18 is fitted to the upper end of the tie rod 11 and fixed to the upper support member 6. The velocity limiter 17 is fitted to the lower end of the tie rod 11. The lower support member 7 is fixed to the velocity limiter 17. However, it is possible to use the lower end portion of the handle 18 as the upper support member 6 without disposing it particularly. Similarly, the upper end portion of the velocity limiter 17 can be used as the lower support member 7 without disposing afresh the lower support member 7.

Figure 5:
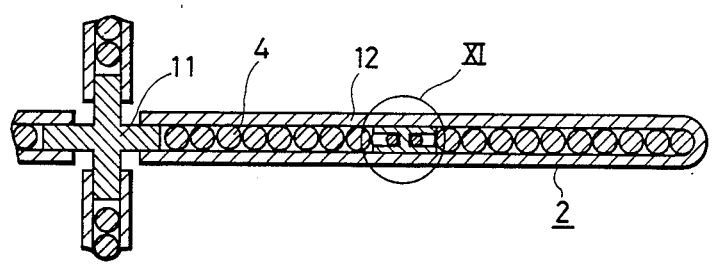
FIG. 5 is a sectional view taken along line V—V of FIGS. 3 and 4.
Figure 6:
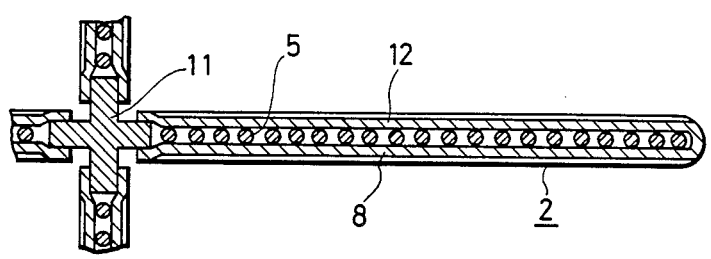
FIG. 6 is a sectional view taken along line VI—VI of FIGS. 3 and 4.

The neutron absorption rods 3 are disposed inside the sheath 12 as shown in FIGS. 5 and 6, and moreover between the upper and lower support members 6 and 7 that are made of SUS (stainless steel) and fitted to the tie rod 11. A round bar of a hafnium metal is used as the neutron absorption rod 3. The neutron absorption rod 3 has an increased diameter portion 4 and a reduced diameter portion 5 as shown in FIG. 4. They consist of a hafnium round bar. The full length of the neutron absorption rod 3 in the axial direction is 360 cm and the length of the increased and reduced diameter portions 4, 5 in the axial direction is 180 cm. The increased diameter portion 4 is 4.8 mm in diameter and the reduced diameter portion 5 is 3.4 mm in diameter. The increased diameter portion 4 is disposed at an upper portion of the blades 2 while the reduced diameter portion 5 is disposed at a lower portion of the blades 2. The neutron absorption rod 3 is produced by joining the upper end of the reduced diameter portion 5 to the lower end of the increased diameter portion 4 in such a manner as to bring their axes into conformity with each other and then welding them together. This joint forms a minute taper portion (about 2 to 3 mm long in the axial direction) which is so minute that it cannot be shown in the drawing and whose diameter changes continuously from the increased diameter portion 4 to the reduced diameter portion 5. This taper portion is part of the reduced diameter portion 5.

Twenty one neutron absorption rods 3 are loaded into one blade 2. The increased and reduced diameter portions 4 and 5 each occupy ½ of the length of the neutron absorption rod (or the neuron absorber packing region inside the blade 2) in the axial direction. Therefore, when the lower region extending from the lower end of the neutron absorber packing region up to the position of ½ of the full length of the neutron absorber packing region in the axial direction (or half the full length of the neutron absorber packing region in the axial direction) is compared with the upper region (having the same length as the lower region) above the lower region inside the neutron absorber packing region of the blade 2 of this embodiment where the neutron absorption rods 3 are disposed, the quantity of the absorption nuclear chain type neutron absorber, that is, the hafnium quantity, in the section perpendicular to the axis is smaller in the lower region than in a major part of the upper region in the axial direction.

Figure 7:
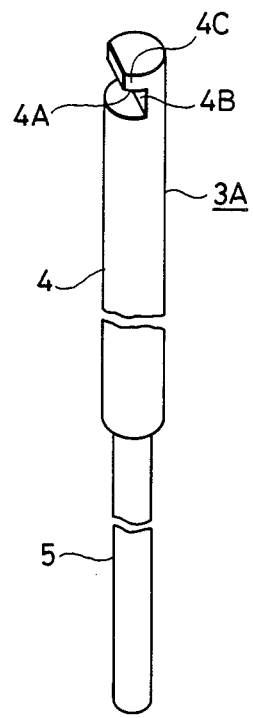
FIGS. 7 and 8 are perspective views of neutron absorbers 3A and 3B shown in FIG. 4, respectively.
Figure 8:
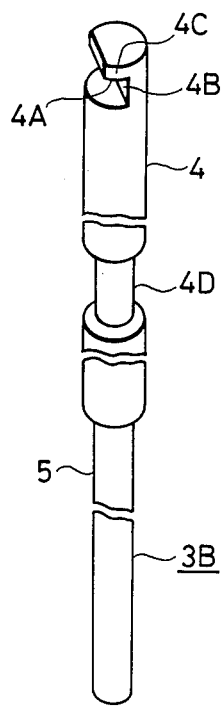

Speaking in further detail, there are two kinds of the neutron absorption rods 3 used in this embodiment, as shown in FIGS. 7 and 8. The neutron absorption rod 3A shown in FIG. 7 has a groove 4A perpendicular to the axis at the upper end portion of the increased diameter portion 4. This groove 4A is positioned and a little bit spaced apart from the upper end portion of the increased diameter portion (or from the upper end of the neutron absorption rod 3A) towards the reduced diameter portion. Therefore, a projection 4C is defined at a portion above the groove 4A of the increased diameter portion 4. The projection 4C is cut off so that the height of the wall of the groove 4A on the side of the projection 4C (or the height from the bottom 4B) is lower than the height of the other opposed wall of the groove 4a (the height from the bottom 4B). The cross-sectional area of the reduced diameter portion 5 in the neutron absorption rod 3A is smaller than that of the major portions of the increased diameter portion 4 in its axial direction except for its groove 4A portion.

On the other hand, the neutron absorption rod 3B shown in FIG. 8 includes a groove 4D in addition to the structure of the neutron absorption rod 3A. The groove 4D is disposed in the increased diameter portion 4 in such a manner as to extend continuously in the circumferential direction. Six grooves 4D exist in the axial direction. Each groove 4D is 2 cm long in the axial direction of the neutron absorption rod 3. The cross-sectional area at a major part of the increased diameter portion 4 in the axial direction except for the groove 4A in the case of the neutron absorption rod 3 and the groove 4A and the six grooves 4D in the case of the neutron absorption rod 3B is greater than the cross-sectional area of the reduced diameter portion. The thickness of each of the increased and reduced diameter portions 4 and 5 is uniform in the axial direction in both the neutron absorption rods 3A and 3B. Two neutron absorption rods 3B are disposed at the center of the blade 2 in the direction of its width.

Figure 9:
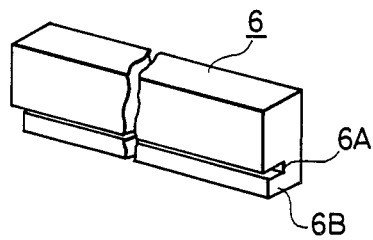
FIG. 9 is a perspective view of an upper support portion shown in FIG. 4.

Next, the structure for fitting each neutron absorption rod 3 to the upper support member 6 will be described. The upper support member 6 is equipped with a groove 6A and a projection 6B as shown in FIG. 9. In other words, the groove 6A that opens on one side surface of the upper support member 6 is formed at the lower end portion of the upper support member 6 so as to extend in its longitudinal direction. The groove 6A defines the continuous projection 6B at the lower end portion of the upper support member 6.

Figure 10:
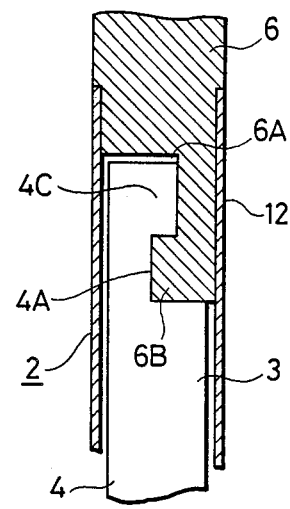
FIG. 10 is a sectional view taken along line X—X of FIG. 4.

The neutron absorption rods 3A and 3B are supported by the upper support member 6 described above. This state will be described in further detail. The projection 4C of each neutron absorption rod 3, 3B is fitted into the groove 6A of the upper support member 6. On the contrary, the projection 6B of the upper support member 6 is fitted into the groove 4B of each neutron absorption rod 3A, 3B. Therefore, since the projection 4C of each neutron absorption rod 3A, 3B is supported by the projection 6B of the upper support member 6, each neutron absorption rod 3A, 3B is supported by the upper support member 6 while being suspended inside the sheath 12 as shown in FIG. 10.

Figure 12:
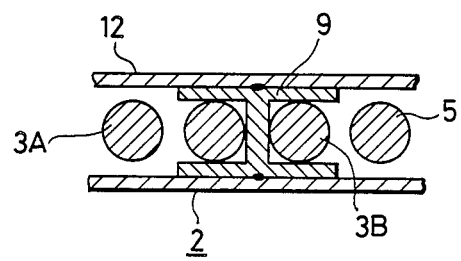
FIG. 12 is a sectional view taken along XII—XII of in FIGS. 3 and 4.

The center of each metal or fitting 9 having an H-shaped cross-sectional shape is disposed between the adjacent neutron absorption rods 3B inside the sheath 12 (see FIG. 12). Twelve metals 9 are disposed in the axial direction of the blade 2. In other words, six metals 9 are disposed in the upper region of the blade 2 where the increased diameter portion 4 exist while the other six metals 9 are disposed in the lower region of the blade 2 where the reduced diameter portion 5 exist. The center of each metal 9, that is disposed between the increased diameter portions of the adjacent neutron absorption rods 3B, is fitted into the grooves 4D of the increased diameter portions 4 facing each other. Both side walls of each metal 9 continuing the center face both side walls of the sheath 12 opposite thereto and are fixed by welding to both side walls 12 of the sheath 12.

FIG. 12 shows the fitting state of the metal 9 disposed in the space 16 between the reduced diameter portions 5 of the adjacent neutron absorption rods 3B. Both side walls of this metal 9 are spot-welded to the sheath 12. The metals 9 fitted to the upper and lower regions are not coupled to the neutron absorption rod 3. Since the metal 9 is made of SUS which is the same as the sheath 12, it can be welded to the sheath 12. However, welding cannot be made between hafnium and SUS.

In the control rod of this embodiment, the thickness of the neutron absorber region in a direction orthogonal to the outer surface of the blade 2 is different in the axial direction of the blade 2. In other words, the thickness of the absorption nuclear chain type neutron absorber (hafnium) in the direction orthogonal to the side surface of the blade 2 is great in the upper region of the blade 2, where the increased diameter portion 4 of the neutron absorption rod 3 having a large diameter exists, and is small in the lower region of the blade 2 where the reduced diameter portion 5 of the neutron absorption rod 3 having a small diameter exists.

The sheath 12 is equipped with inwardly projecting projections 8 on its both side surfaces. These projections 8 are formed by inwardly extending part of the structural material of the sheath 12. As shown in FIGS. 3 and 4, each projection 8 is disposed in the region where the thickness of the absorption nuclear neutron absorber is small in the direction orthogonal to the side surfaces of the blade, that is, in the lower region of the control rod 1 where the reduced diameter portion of the neutron absorption rod 3 is disposed. The reduced diameter portion 5 of the neutron absorption rod 3 is clamped by the two projections 8 that are disposed on both sides of the sheath 12 and oppose each other. Such pairs of projections 8 are disposed at several positions at the lower portions of the blade 2.

The control rod 1 of this embodiment is loaded into the core of the boiling water reactor from the side of the handle 18 at the upper end. The side of the upper support member 6 of the neutron absorber region corresponds to the loading side of the control rod.

The boundary between the upper and lower regions of the control rod 1 is positioned at the position of $\frac{1}{2}$ of the full length of the neutron absorber packing region from the lower end of the neutron absorber packing region, as described already. Therefore, effective neutron absorption capacity can be obtained during the stop of the operation of the reactor with the control rod being loaded thereinto, in response to the neutron importance distribution shown in FIG. 1. In other words, as can be seen clearly from FIG. 2, even if the control rod 1 having a maximum value is not loaded into the core at the stop of the operation of the reactor, the effective multiplication factor Keff of the boiling water reactor becomes 0.986. The use of such a control rod 1 provides a greater reactor stop margin and improves safety of the reactor.

In the control rod 1 of this embodiment, each neutron absorption rod 3 consisting of the increased diameter portion 4 and the reduced diameter portion 5 is disposed inside the blade 2, and the weight of the control rod 1 is substantially equal to the weight of the conventional control rod consisting of the neutron absorption rods into which $B_4C$ is packed. Therefore, the control rod 1 of this embodiment can be operated easily by the conventional control rod driving device, or in other words, good operability of the control rod 1 can be obtained. The width of each blade 2 of the control rod 1 is equal to that of the blade of the conventional control rod. For this reason, it is not necessary to make any modification such as the change of a control rod guide tube disposed at the lower part of the core inside the pressure container of the reactor or a fuel support metal disposed on a core support.

The neutron absorption rod 3 uses Hf as the neutron absorber. Hafnium Hf is an absorption nuclear chain type neutron absorber and does not generate any gas upon absorption of neutron. Therefore, the mechanical life of the neutron absorption rod 3 of the control rod 1 can be extended. Since the neutron absorption rod 3 uses Hf which is the absorption nuclear chain type neutron absorber, the neutron absorption rod 3 absorbs neutrons thereby to generate a new neutron absorber, so that the nuclear life can be extended, too. Here, the diameter of the increased diameter portion 4 of the neutron absorption rod 3 is substantially equal to the diameter of the neutron absorption rod having $B_4C$ packed therein in the conventional control rod for use in the boiling water reactor. The length of the neutron absorption rod 3 in its axial direction is substantially equal to the effective fuel length (366 cm) of the fuel assembly in the same way as the neutron absorption rod of the conventional control rod. The term "effective fuel length" of the fuel assembly means the length of the region in which the fuel pellet is packed, in the axial direction.

According to the construction described above, the weight of the control rod is substantially equal to that of the conventional control rod and the reactivity control capacity of the control rod is substantially equal, too, to that of the conventional control rod. Moreover, the life is as high as four times in the upper region and as high as three times in the lower region in comparison with the conventional control rod.

Since the neutron absorption rods 3 engage with the upper support member 6 fixed to the tie rod 11 in the embodiment described above, it becomes possible to prevent completely collision of the end portion of the neutron absorption rod 3 on its insertion side (the upper end portion in FIG. 4) against the upper support member even when the control rod 1 is rapidly inserted into the core at the time of scram of the reactor. In other words, the groove 4A formed at the upper end portion of the increased diameter portion 4 meshes with the projection 6B of the upper support member 6 and the upper and lower side surfaces of the groove 4A come into contact with the upper and lower surfaces of the projection 6B, and this arrangement can completely prevent upward movement of the neutron absorption rods 3 due to drastic deceleration immediately before completion of scram of the reactor, and collision between the insertion end portion of the neutron absorption rod 3 and the upper support member 6 can be prevented. The meshing structure between the neutron absorption rod 3 and the upper support member 6 described above is structurally simple. The meshing state between the groove 4A and the projection 6B is maintained during the life of the control rod 1, so that any collision between the neutron absorption rod 3 and the upper support member 6 cannot occur for a long period until the control rod 1 reaches its life.

This embodiment solves the problem of the control rod of the afore-mentioned reference Japanese Patent Laid-Open No. 171293/1982 which reduces the gap, occurring between the neutron absorption rod having B$_4$C packed thereto and the stainless pipe, by providing the stainless pipe as a shock absorber. It is difficult to make completely uniform the length of the neutron absorption rods inside the blade which is 4 m long. Therefore, variance of 2–3 mm on an average and maximum 5–6 mm occurs and for this reason, the gap between all the neutron absorption rods inside the blade and the stainless pipe cannot be made completely zero. At the time of rapid stop after rapid insertion of the control rod into the core within one second upon scram of the reactor, enormous acceleration acts upon each neutron absorption rod. Due to the rapid deceleration before the rapid stop at completion of the loading of the control rod, the neutron absorption rods at the upper end portion that define any gap between them and the stainless pipe collide vigorously against the stainless pipe. In consequence, the stainless pipe is crashed (particularly by the neutron absorption rods having a large gap with the stainless pipe) by one scram operation, and there is the possibility that such a stainless pipe might not exhibit its buffer function in the subsequent scram operations, and the structural members positioned on the insertion side of the control rod are likely to receive the impact of the neutron absorption rods. Particularly when the neutron absorption rod is made of Hf, the stainless pipe is likely to get crushed by one scram operation as described above. However, the control rod 1 of this embodiment is free from such a problem.

Figure 13:
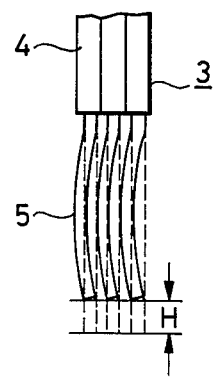
FIG. 13 is an explanatory view useful for explaining the curvature that occurs in a reduced diameter portion of a neutron absorber at the time of scram of a reactor.

The engagement between the neutron absorption rod 3 and the upper support member 6 can solve the problem peculiar to the control rod 1 equipped with the neutron absorption rod 3 whose upper region consists of the increased diameter portion 4 and whose lower region consists of the reduced diameter portion 5. When the neutron absorption rods 3 consisting of the increased and reduced diameter portions 4, 5 are loaded inside the blade 2, the increased diameter portions 4 of the adjacent neutron absorption rods 3 are in mutual contact as shown in FIG. 4. However, gaps 16 are defined between the reduced diameter portions 5 of the adjacent neutron absorption rods 3 as shown in FIG. 4. For this reason, unless the lower end portion of the reduced diameter portion 5 of each neutron absorption rod 3 is meshed with the lower support member 7, the neutron absorption rod 3 will move upward and impinge against the upper support member 6 upon rapid deceleration of the control rod at the time of scram of the reactor, so that the reduced diameter portion 5 of the neutron absorption rod 3 is curved due to the force of inertia at the time of collision as shown in FIG. 13 and the lower end of the reduced diameter portion 5 is lifted up by a dimension H. This means that the neutron absorber packing region is reduced temporarily by the dimension H upon collision between the neutron absorption rod 3 and the upper support member 6 and the neutron absorption capacity at the lower part of the core drops at the time of scram of the reactor.

In accordance with this embodiment, the neutron absorption rod 3 and the upper support member 6 mesh with each other and the former is suspended as shown in FIG. 10 and the load of the increased diameter portion 4 does not act upon the reduced diameter portion 5. Therefore, during the rapid loading operation of the control rod at the time of scram of the reactor, the curving phenomenon of the reduced diameter portion shown in FIG. 13 does not occur easily and reduction of the neutron absorber packing region does not occur easily, either. Accordingly, in accordance with this embodiment, neutron absorption is not impeded at the lower part of the core region at the time of scram of the reactor.

The deviation of the reduced diameter portion 5 in the direction of width of the blade 12 due to the formation of the gaps 16 between the adjacent reduced diameter portions 5 can be prevented by inserting a spacer (not shown) into each gap 16. Furthermore, the movement of the reduced diameter portion 5 in a direction orthogonal to the side surface of the blade 2 can be prevented by the projections 8 formed on the sheath 12 as will be described next.

Since the projections 8 formed on the inner surface of the side surface of the sheath 12 hold the reduced diameter portion 5 of the neutron absorption rod 3, it becomes possible to control the movement of the reduced diameter portion 5 of the neutron absorption rod 3 in a direction orthogonal to the side surface of the sheath 12, that is, to the side surface of the blade 2, inside the sheath 12. Therefore, there is no possibility that the reduced diameter portion 5 of the neutron absorption rod 3 moves in the direction of thickness of the blade 2 inside the sheath 12 due to earthquake, fluidization of the cooling water, or the like, while the control rod 1 is loaded into the reactor, and impedes the reactivity control. Provision of such projections 8 which can inhibit the change of reactivity results in the improvement in bending rigidity of the sheath 12 and the thickness of the sheath 12 can be reduced. This results also in the decrease of the weight of the control rod 1.

In the control rod 1 of this embodiment, the metals 9 are disposed inside the blade 2 in order to interconnect the side walls of the sheath 12, so that outward deformation of the sheath 12 can be prevented. Moreover, it is necessary only to reduce somewhat locally the diameter of the increased diameter portion 4 as the fitting portion of the metal 9 in order to dispose the metal 9, and the decreasing amount of the neutron absorber inside the blade 2 due to the disposition of the metal 9 is trace. This will be obvious from the comparison with the case where one stainless rod (having the same length in the axial direction as that of the neutron absorption rod 3) is inserted into the blade 2 and the sheath 12 is spot-welded to this stainless rod.

Next, one example of the core of a boiling water reactor to which the control rod 1 of this embodiment is applied will be described.

The core shown in FIG. 2 of the prior art reference U.S. Pat. No. 4,460,538 (corresponding to Japanese Patent Publication No. 7397/1982) has been proposed as the core of a boiling water reactor. The core structure of this U.S. Pat. No. 4,460,538 is such as described in column 4, line 24 to column 6, line 35. The core structure includes a control rod for adjusting the output which is loaded into the core during the reactor operation and adjusts the reactor output, and a control rod for stopping the reactor which is pulled out completely from the core during the reactor operation and is rapidly inserted fully into the reactor at the stop of the reactor operation. The output adjusting control rod, too, is completely inserted into the core at the stop of the reactor operation. These output adjusting control rods and reactor stop control rods are disposed alternately and one by one in the checkerboard arrangement as shown in FIG. 2 of the U.S. patent.

Each output adjusting control rod is inserted into the core almost fully during the reactor operation and neutron is continuously irradiated to this control rod. Therefore, the control rod 1 of the embodiment described above is used preferably as this output adjusting control rod. Since the reactor stop control rod is pulled out completely from the core during the reactor operation, its absorption quantity of neutron is small. Therefore, the control rod described in column 15, lines 35 to 57 and shown in FIG. 9A of U.S. Pat. No. 4,285,769 (corresponding to Japanese Patent Publication No. 44237/1983) is used as the reactor stop control rod. This control rod includes a large number of neutron absorption rods formed by packing B$_4$C into the crisscross blade, but does not include the absorption nuclear chain type neutron absorber. The length of the neutron absorption rod having B$_4$C packed thereto in the axial direction is substantially the same as the effective fuel length of the fuel assembly. The structures of the control rod driving devices for driving the two kinds of control rods are the same. In the case of the boiling water reactor, the control driving devices are disposed at the lower part of the reactor container storing therein the core, and these control rods are loaded into the core from below.

Another embodiment of the control rod of the present invention will be described next.

The control rod 21 of this embodiment is produced by disposing alternately the neutron absorption rods 23 having the same axial length as the neutron absorption rod 3 and the neutron absorption rods 24 having the axial length of the half of that of the neutron absorption rod 3 into each sheath 12 that constitutes four blades disposed in the crisscross form. These neutron absorption rods 23 and 24 consist of hafnium round bars, respectively. The groove 4A and projection 4C, that are shown in FIG. 7, are disposed at the upper end portion of each of the neutron absorption rods 23 and 24. These neutron absorption rods are suspended on the upper support members 6 (not shown) in the same way as the aforementioned neutron absorption rods 3A and 3B or as shown in FIG. 10. The neutron absorption rods 23 and 24 have the same diameter and their thickness in the axial direction is uniform except for their upper end portion. Incidentally, the control rod 21 of this embodiment has the same structure as the control rod 1 except that the projection 8 is not disposed and the shape of the neutron absorption rod is different. The metal 9 in the lower region is disposed in the gap between the adjacent neutron absorption rods 23. In this embodiment, too, the control rod 21 is divided into the upper and lower regions at the position of half of its full axial length from the lower end of the neutron absorber packing region in the same way as the control rod 1 of the foregoing embodiment and the hafnium quantity on the section perpendicular to the axis of the upper region is greater than the hafnium quantity on the same section of the lower region.

The control rod 21 described above can provide the same effect as that of the control rod 1 of the foregoing embodiment.

Figure 15:
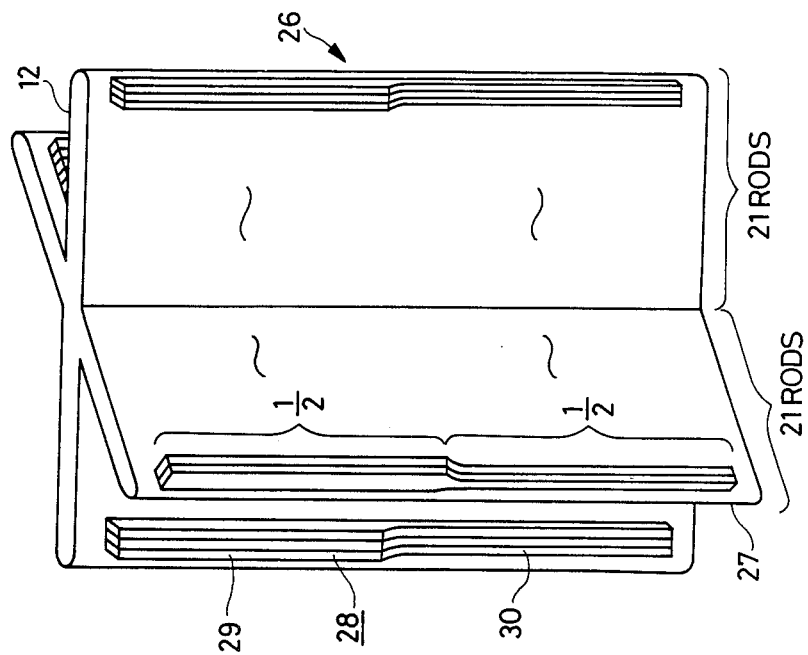
Figure 14:
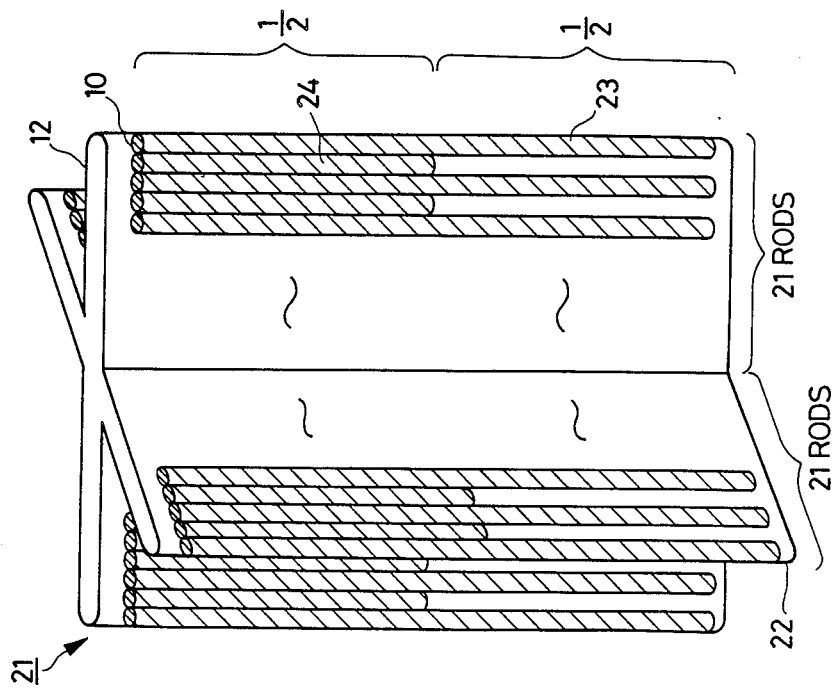
Figure 16:
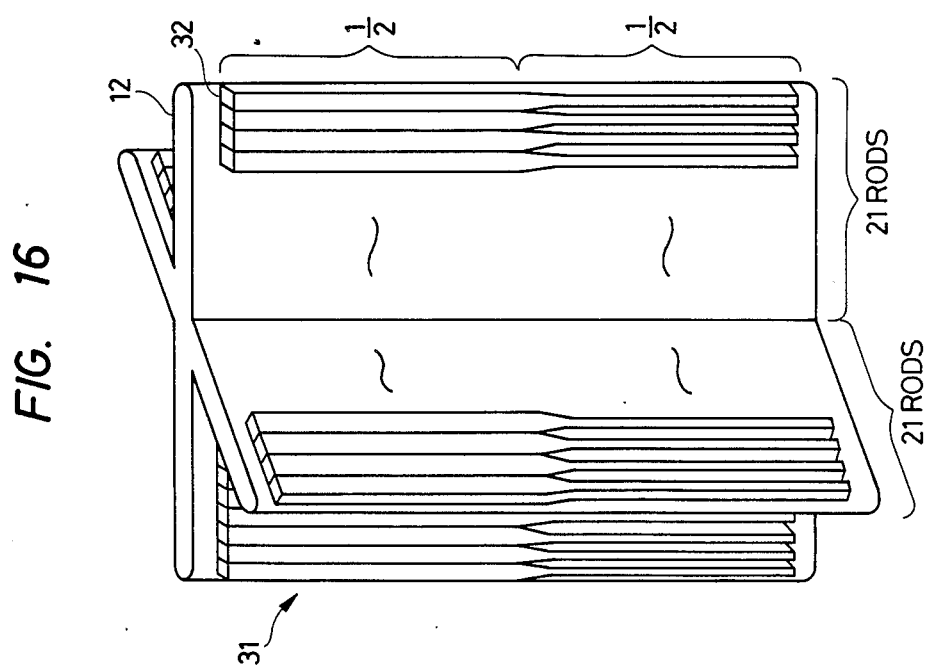

In the embodiments described above, the neutron absorption rods each consisting of the hafnium round bar are disposed inside the blade. However, the cross-sectional shape of the neutron absorption rod can be rectangular. FIGS. 15 and 16 show a control rod using the neutron absorption rods having a rectangular cross-sectional shape. These drawings show the arrangement of the neutron absorption rods inside the blades of the control rod, but the other structures are the same as those of the control rod 1.

In the control rod 26 of FIG. 15, a plurality of neutron absorption rods 28 consisting of hafnium having a rectangular cross-sectional shape are shown disposed inside each blade 27 having the sheath 12. Each neutron absorption rod 28 is divided into the upper and lower regions 29 and 30 at the center of its full length from the lower end, and the cross-sectional area of the upper region 29 having the rectangular cross-sectional shape is greater than that of the lower region 30 having the rectangular cross-sectional shape. The cross-sectional area of the lower region 30 is contracted as compared with that of the upper region 29 in a direction perpendicular to the surface of the blade 27.

In the control rod 31 of FIG. 16, a plurality of neutron absorption rods 32 having substantially the same shape as the neutron absorption rods 28 are disposed inside the sheaths 12 constituting the blades 33 while the neutron absorption rod 28 is rotated by 90°. The neutron absorption rod 32 is made of hafnium, too. The thickness of the neutron control rod 32 in a direction perpendicular to the side surface of the blade 33 is greater than that of the neutron absorption rod 28 in the direction of width of the blade 22. These control rods 26 and 31 can provide the same effect as that of the control rod 1. However, the control rod 26 does not need any means for preventing the deviation of the lower region 30 in the direction of width of the blade 27, and the control rod 31 does not need the provision of the projection 8 on the sheath 12.

Figure 17:
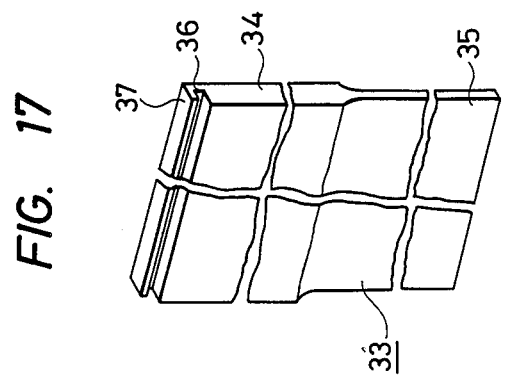
FIG. 17 is a perspective view of another embodiment of the neutron absorber.

FIG. 17 illustrates a sheet-like neutron absorption member 33 made of hafnium. The neutron absorption member 33 is divided, too, into the upper and lower regions 34 and 35 at the center of its axial length. A groove 36 and a projection 37 are formed at the upper end of the upper region 34 in the same way as in the neutron control rods 3A and 3B. The cross-sectional area of the upper region 34 in uniform throughout the major part of its portions in the axial direction except for the upper end portion. The cross-sectional area of the lower region 35 is smaller than that of the major part of the upper region 34 except for its groove portion 36 in the axial direction of the upper region 34, and the cross-sectional area of the lower region 35 is uniform mostly in the axial direction except for its upper end portion where it is interconnected to the upper region 34. The neutron absorption member 33 is disposed inside each blade 2 of the control rod 1 in place of the neutron absorption rod 3. The groove 36 and projection 37 at the upper end of the neutron absorption member 33 mesh with the projection 6B and groove 6A of the upper support member 6, respectively. Such a control rod can provide the same effect as that of the control rod 1 and moreover, the neutron absorption member 33 can be worked extremely easily. For, it can be produced by merely cutting off both surfaces at the lower part of a hafnium plate.

Figure 18:
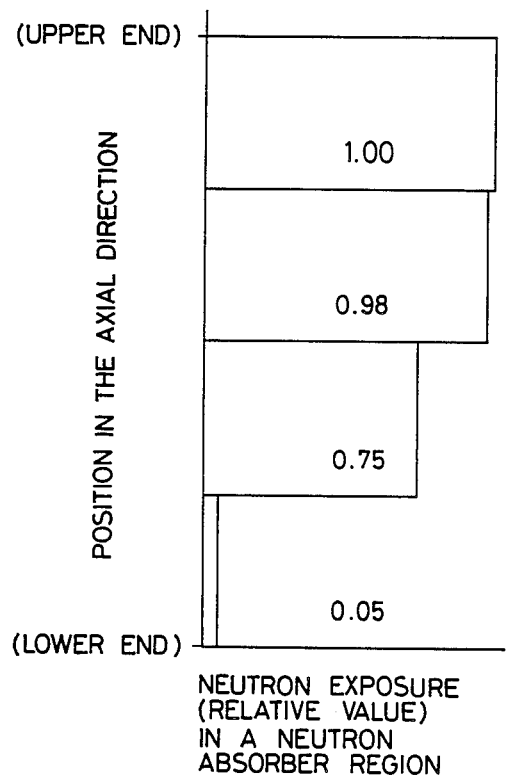
FIG. 18 is a characteristic diagram of neutron exposure distribution in an axial direction.

FIG. 18 shows the distribution of the neutron exposure of the neutron absorber packing region in the axial direction of the control rod. In the diagram, the upper end corresponds to the upper end of the neutron absorber packing region and the lower end does to the lower end of the neutron absorber packing region. Numerals in the diagram represent the relative values standardized by the maximum value of the neutron exposure at respective positions. In accordance with FIG. 18, it can be understood that the neutron exposure is great within the region extending from the upper end of the neutron absorber packing region to ¾ of its full axial length. A control rod in accordance with still another embodiment of the present invention, wherein the amount of the neutron absorber is changed in the axial direction on the basis of the fact described above, is shown in FIGS. 19 and 20.

In the control rod 40 shown in FIG. 19, a plurality of neutron absorption rods 42 are disposed in the sheath 12 constituting each blade 41. These neutron control rods 42 consist of hafnium round bars, and their upper end portion has a structure such as shown in FIG. 10 and meshes with the upper support member 6. Each neutron absorption rod 42 is divided into the increased diameter portion 43 as the upper region and the reduced diameter portion 44 as the lower region at the half of its full axial length. The lower region is further divided into an intermediate portion 44A and the lower most portion 44B at the half of the full axial length of the lower region from the lower end of the neuron absorption rod 42. The increased diameter portion 43 of the neutron absorption rod 42 is 4.8 mm in diameter, and the intermediate portion 44A and the lowermost portion 44B are 3.9 mm and 2.8 mm in diameter, respectively. The diameters of these portions are determined on the basis of the neutron exposure distribution shown in FIG. 18. The diameter of each portion is uniform in its axial direction, and the other structure of the control rod 40 is the same as that of the control rod 1. The control rod 40 of this embodiment can provide the same effect as that of the control rod 1.

A control rod 45 shown in FIG. 20 is produced by disposing the neutron absorption rods 46, which are obtained by gradually tapering the intermediate portion 44 of the neutron absorption rod 42 of the control rod 40 of the embodiment described above in such a manner that the diameter decreases gradually from that of the increased diameter portion 43 to the diameter of the lowermost portion 44B, into the sheath 12 constituting each blade 47. The other construction of this control rod is the same as that of the control rod 40.

Figure 11:
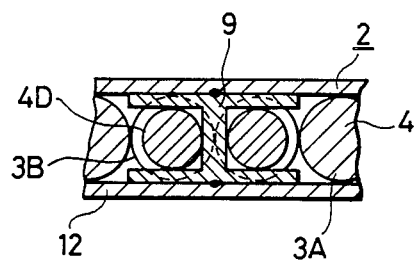
FIG. 11 is an enlarged view of the portion XI shown in FIG. 5.
Figure 21:
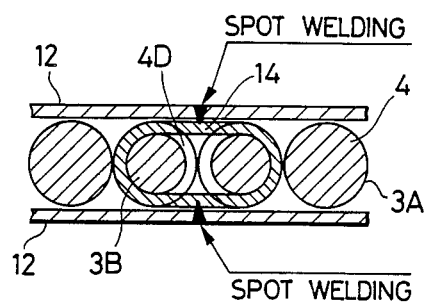
FIGS. 21, 22 and 23 are cross-sectional views of structures for preventing outward deformation of a sheath.

Next, still another embodiment of the present invention disposed in the blade 2 and having a structure for preventing the outward deformation of the sheath 12, particularly suitable for the upper region, will be described with reference to FIG. 21. FIG. 21 is a sectional view taken along line V—V of FIG. 4. The structure for preventing the outward deformation of the sheath 12 in this embodiment uses ring-like metals 14 in place of the metals 9 shown in FIG. 11. Each ring-like metal 14 is fitted into the grooves 4D formed in the adjacent two neutron absorption rods 3B and wound around the two neutron absorption rods 3B. The length of each groove 4D in the axial direction is greater than the axial length of the ring-like metal 14, and the ring-like metal 14 and the neutron absorption rod 3B are not fixed to each other. Both surfaces of the metal 14 facing the sheath 12 are fixed by spot welding to the sheath 12. Though fitting of the metals 14 is a little bit more troublesome than that of FIG. 11, this structure provides the same effect as that of the structure shown in FIG. 11.

Figure 22:
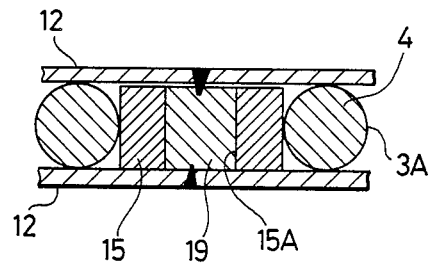

FIG. 22 shows still another embodiment of the structure for preventing the outward deformation of the sheath 12, and shows the transverse section corresponding to the section taken along line V—V of FIG. 4. Each rectangular hafnium bar 15 having a width which is twice the diameter of the neutron absorption rods 3A at the center of the blade 2 in the direction of its width. Twelve through-holes 15A are bored in the axial direction of this hafnium bar 15. Each through hole 15A faces in a direction perpendicular to the side surface of the blade 2. A metal 19 made of SUS and having the same outer diameter as the inner diameter of the through-hole 15A is fitted into each through-hole 15A. Both ends of this metal 19 are spot-welded to the side walls of the sheath 12 facing each other. The structure of this embodiment provides the same effect as the structure shown in FIG. 11.

Figure 23:
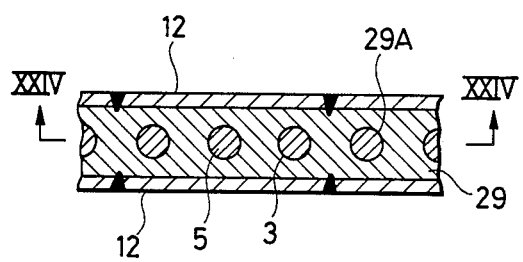
Figure 24:
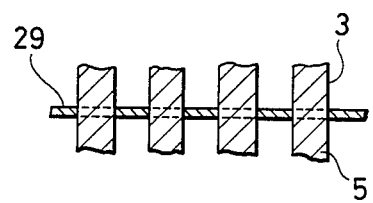
FIG. 24 is a sectional view taken along line XXIV—XXIV of FIG. 23.

Still another embodiment of the structure for preventing the outward deformation of the sheath in the lower region of the control rod 1 will be further described with reference to FIGS. 23 and 24. FIG. 23 shows the transverse section corresponding to the section taken along line XII—XII of FIG. 4. Each metal 29 is a stainless plate having the same width as the gap between the opposed side walls of the sheath 12, and the same number of holes 29A, which has the same inner diameter as the outer diameter of the reduced diameter portion 5 of the neutron absorption rod 3, as the number of neutron absorption rods 3 in the blade 2 are disposed in the stainless plate or the metal 29. Six metals 29 are disposed in the axial direction of the lower region. The reduced diameter portion 5 of each neutron absorption rod 3 is fitted into each hole 29A of the metal 29. Both side surfaces of each metal 29 are spot-welded to the opposed side walls of the sheath 12 at an arbitrary position. Such a metal 29 can prevent the outward deformation of the sheath 12 as well as the movement of the reduced diameter portion 5 in a direction perpendicular to the side surface of the blade 2 and also in the direction of width of the blade 2. Therefore, the control rod 1 using such metals 29 does not need the provision of the projection 8 on the sheath 12 and any separate means for preventing the movement of the reduced diameter portion 5 in the direction of width of the blade 2 need not be disposed.

The structure shown in FIGS. 21 to 23 can be applied to the control rods shown in FIGS. 14 to 16, 17 and 20 and further to the later-appearing control rod shown in FIG. 25.

Finally, a control rod in still another embodiment of the present invention, wherein the suspension structure of the neutron absorption rod 3 inside the blade 2 of the control rod 1 is modified, will be explained with reference to FIGS. 25 to 27.

In the control rod 50 of this embodiment, the neutron absorption rods 51 are disposed inside the sheath 12. In other words, the neutron absorption rods 51 are disposed inside the sheath 12 as shown in FIG. 25 and are held between the upper and lower support members 6 and 7 that are made of SUS and fitted to the tie rod 11. Each neutron absorption rod 51 is not bonded to the sheath 5, the upper support member 6 and the lower support member 7, but is merely disposed inside the space encompassed by these members 5, 6 and 7.

Each neutron absorption rod 51 consists of a Hf round bar and its a cross-sectional area is different between the lower portion extending from its lower end to the center of its full length and the upper portion from the center to the upper end. In other words, the diameter of the neutron absorption rod 51 is 3.4 mm in the lower portion, that is, in the reduced diameter portion 53, and is 4.8 mm in the upper portion, that is, in the increased diameter portion 52.

The neutron absorption rod 51 of this embodiment is not equipped with the groove 4A and the projection 4C at the upper end portion unlike the absorption rod 3 of the aforementioned embodiment, but is instead equipped with a groove 52A at the increased diameter portion 52.

The neutron absorption rod 51 is supported at its increased diameter portion 52 by the support member 54 which is spot-welded to the sheath 12. Accordingly, the neutron absorption rod 51 is suspended inside the sheath 12 while its both ends are out of contact with the upper and lower support members 6 and 7. The support structure of the neutron absorption rod will be described in further detail with reference to FIGS. 26 and 27.

The support member 54 consists of a pair of support portions 54A and 54B. The support portions 54A and 54B have the same number of semicircular notches 55 as the number of neutron absorption rods 51 in one blade 2. The support portions 54A and 54B are arranged at the upper part of each blade 2 in such a manner that each notch 55 faces the other in the direction of width of the blade 2 inside the sheath 12 (in a direction at right angles to the axis of the control rod 1). The support portions 54A and 54B are made of SUS in the same way as the sheath 12 and spot-welded to the sheath 12. Reference numeral 56 represents each spot-welded portion. A groove 52A is formed at a part of the increased diameter portion 52 of the neutron absorption rod 51 in such a manner that its diameter is somewhat smaller than that of the increased diameter portion 52. Part of the support portions 54A and 54B arranged so as to face each other is fitted into this groove 52A. Therefore, each neutron absorption rod 51 is supported and suspended by the support member 54 at the increased diameter portion 52. Gaps 17 are defined between the upper end of the neutron absorption rod 51 and the upper support member 6 and between the lower end of the neutron absorption rod 51 (the end of the control rod driving device connection side) and the lower support portion 7 in order to absorb extension of the neutron absorption rod 51 in its axial direction due to thermal expansion inside the reactor.

The control rod of this embodiment provides the same effect as the effect of the control rod 1.

Furthermore, this embodiment can prevent the outward expansion of the sheath 12 because the support portions 54A and 54B are fitted to the inside of the sheath 12. This outward expansion of the sheath 12 can be made more reliable by coupling the support portions 54A and 54B by screws, welding, and the like.

FIG. 28 shows still another example of the support member 57. This support member 57 consists of one member and has notches 57A extending on one surface of the support member 57 from its center in a direction orthogonal to the side surface of the blade. The number of these notches 57A is equal to the number of neutron absorption rods 51. Part of the support member 57 is fitted into the groove 52A of each of all the neutron absorption rods 51 disposed inside the sheath 12. The support member 57 are spot-welded on its both side surfaces to the sheath 12.

The control rod of this embodiment can provide the same effect as the effect of the afore-mentioned embodiments. In addition, since the support member 57 consists of one member, it can be produced more easily than the support member 54 of the embodiment described above. The structure shown in FIGS. 27 and 28 can be applied to the control rods shown in FIGS. 14 to 17, 17, 19 and 20.

In accordance with the present invention, the amount of the absorption nuclear chain type neutron absorber in the lower region is decreased in the axial direction of the blade. Therefore, the present invention can obtain an effective neutron absorption capacity in response to the neutron importance distribution during the stop of the reactor operation, and can therefore increase the reactor stop margin. Moreover, since the invention can reduce the weight of the control rod, it can obtain good operability of the control rod. Furthermore, since the invention uses the absorption nuclear chain type neutron absorber, it can extend the mechanical and nuclear life of the control rod.

What is claimed is:

1. In a boiling water nuclear reactor having a core, control rods for controlling the reactivity of said core, and insertion means disposed below said core for inserting said control rods into said core, each said control rod comprising:

a neutron absorption region containing therein neutron absorbers made of absorption nuclear chain type neutron absorber in which nuclides that absorb further neutrons appear in the nuclides formed by the neutron absorption reaction or disintegrated nuclides thereof and which are low in attenuation speed of the neutron absorption effect; and means for supporting said neutron absorbers in a predetermined position so as to prevent axial and radial movement thereof;

wherein said neutron absorption region is divided into upper and lower regions in an axial direction of said control rod, said upper and lower regions having identical neutron absorbers, and said upper region of said control rod is inserted into said core by said insertion means before insertion of said lower region into said core by said insertion means;

the quantity of said absorption nuclear chain type neutron absorber contained in said lower region in a section perpendicular to the axial direction is smaller than the quantity of said absorption nuclear chain type neutron absorber contained in said upper region in a section perpendicular to the axial direction; and a boundary between said upper and lower regions at which the quantity of said absorption nuclear chain type neutron absorber physically changes in the axial direction between said upper and lower regions is positioned within a range of from ⅜ to ⅝ of the full length of said neutron absorption region in the axial direction from a lower end of said neutron absorption region.

2. The control rod as defined in claim 1, wherein the quantity of said absorption nuclear chain type neutron absorber extending in the axial direction at a major part of said upper region is substantially uniform and the quantity of said absorption nuclear chain type neutron absorber extending in the axial direction at a major part of the lower region is substantially uniform.

3. The control rod as defined in claim 1, wherein each of said neutron absorbers is a plate of said absorption nuclear chain type neutron absorber extending in the axial direction, a cross-sectional area of an upper part of said plate disposed in said upper region being larger than a cross-section area of lower part of said plate disposed in said lower region.

4. The control rod as defined in claim 3, wherein said plate has a thickness in said upper region which is larger than the thickness in said lower region, the boundary between said upper and lower regions being at a position at which the thickness of said plate changes.

5. The control rod as defined in claim 1, wherein each of said neutron absorbers is a rod of said absorption nuclear chain type neutron absorber, a plurality of absorption nuclear chain-type neutron absorber rods being disposed in said neutron adsorption region.

6. The control rod as defined in claim 5, wherein each of said absorption nuclear chain type neutron absorber rods includes an upper part disposed in said upper region and a lower part disposed in said lower region, the lower part disposed in said lower region having a smaller diameter than that of said upper part, 7. The control rod as defined in claim 6, wherein the boundary between said upper and lower regions is at a position at which the diameter changes.

8. The control rod as defined in claim 5, wherein the cross-sectional shape of each of said upper and lower regions of said neutron absorption rod is a circle and the axes of said upper and lower regions are aligned with each other.

9. The control rod as defined in claim 5, wherein the cross-sectional area of said neutron absorption rod is substantially uniform at a major part of each of said upper and lower regions in the axial direction.

10. The control rod as defined in claim 1, wherein said absorption nuclear chain type absorber is one selected from a group consisting of Hf, Ta, Ag-In-Cd alloy and $Eu_2O_3$.

11. The control rod as defined in claim 1, further comprising:

a plurality of blades equipped with sheaths encompassing said neutron absorption region, said blades of said control rod being inserted into said core by said insertion means; and first sheath deformation prevention mean disposed in at least one of a groove and an opening provided in said neutron absorbers and between opposed side walls of each of said sheaths, and fitted to said side walls of said sheaths.

12. The control rod as defined in claim 11, wherein said first sheath deformation means is disposed in at least one of a groove and an opening in each of said neutron absorbers.

13. The control rod as defined in claim 11, wherein said absorption nuclear chain type absorber is one selected from a group consisting of Hf, Ta, Ag-In-Cd alloy and $Eu_2O_3$.

14. The control rod as defined in claim 11, wherein each of said neutron absorbers is a rod of said absorption nuclear chain type neutron absorber, a plurality of absorption nuclear chain-type neutron absorber rods being disposed in said neutron absorption region.

15. The control rod as defined in claim 14, wherein the cross-sectional area of said neutron absorption rod is substantially uniform at a major part of each of said upper and lower regions in the axial direction.

16. The control rod as defined in claim 14, wherein said first sheath deformation prevention means is disposed in at least one of a groove and an opening provided in said upper region of said absorption rods, and further comprising second sheath deformation prevention means disposed in gaps defined between adjacent neutron absorption rods in said lower region and between said opposed side walls of said sheaths and fitted to said side walls of said sheaths.

17. The control rod as defined in claim 16, wherein said absorption nuclear chain type absorber is one selected from a group consisting of Hf, Ta, Ag-In-Cd alloy and $Eu_2O_3$.

18. The control rod as defined in claim 16, wherein the cross-sectional area of said neutron absorption rod is substantially uniform at a major part of each of said upper and lower regions in the axial direction.

19. The control rod as defined in claim 16, wherein said first sheath deformation prevention means includes a metal fitted into opposed grooves of said neutron absorption rod in said upper region and having both end surfaces facing the side surfaces of said sheaths opposite to each other, said metal is made of a metal material capable of welding to said sheath and each of the end surfaces of said metal is welded to each of said side walls of said sheath.

20. The control rod as defined in claim 16, wherein said first sheath deformation prevention means is a metal fitted into a recess formed in said neutron absorption rod in said upper region and wound on said neutron absorption rod, and said metal is made of a metal material capable of welding to said sheath and welded to said side wall of each of said sheaths opposite to each other.

21. The control rod as defined in claim 16, wherein said first sheath deformation prevention means is a metal fitted into each opening formed in said neutron absorption rod, and said metal is fitted to said side wall of said sheaths opposite to each other.

22. The control rod as defined in claim 16, wherein said sheath deformation prevention means is a member having the same width as the width of the gap between the side walls of said sheaths opposite to each other, has an opening for the passage of a reduced diameter portion of said neutron absorption rod and can be welded to said sheath.

23. The control rod as defined in claim 1, further comprising:

a plurality of blades equipped with sheaths encompassing said neutron absorption region, said blades of said control rod being inserted into said core by said insertion means; and restriction-support means disposed inside said blades for restricting the movement of said neutron absorbers in the axial direction and for supporting said neutron absorbers in a suspension state.

24. The control rod as defined in claim 23, wherein said absorption nuclear chain type absorber is one selected from the group consisting of Hf, Ta, Ag-In-Cd alloy and $Eu_2O_3$.

25. The control rod as defined in claim 23, wherein the cross-sectional area of said neutron absorber is substantially uniform at a major part of each of said upper and lower regions in the axial direction.

26. The control rod as defined in claim 23, wherein said upper region of said neutron absorber is supported by said restriction-support means.

27. The control rod as defined in claim 23, wherein said neutron absorber is a plurality of neutron absorption rods having a cross-section in said lower region which is smaller than a cross-section in said upper region.

28. The control rod as defined in claim 27, wherein an upper end portion of said neutron absorption rod is supported by said neutron restriction-support means.

* * * * *